Patented July 15, 1947

2,423,895

UNITED STATES PATENT OFFICE 2,423,895

METHOD OF PRODUCTION OF ANHYDROUS FLUOROPHOSPHORIC ACID

Willy Lange, Cincinnati, Ohio, and Ralph Livingston, Chicago, Ill., assignors, by direct and mesne assignments, to Ozark-Mahoning Company, a corporation of Delaware No Drawing. Application September 26, 1944, Serial No. 555,888

10 Claims. (Cl. 23—139)

Our invention relates to the production of anhydrous monofluorophosphoric acid $H_2PO_3F$ and anhydrous difluorophosphoric acid $HPO_2F_2$ since in accordance with the specific manner in which it is practised either or both of them can be prepared thereby.

In United States Letters Patent 2,408,784, granted October 8, 1946, on an application filed by us jointly, the anhydrous monofluorophosphoric acid and a method of producing it from anhydrous hydrofluoric acid (HF) and water-free metaphosphoric acid ($HPO_3$) are disclosed and claimed, and in United States Letters Patent 2,408,785, granted October 8, 1946, on an application filed by Willy Lange, a method of producing the monofluorophosphoric acid alone or in conjunction with the difluorophosphoric acid from phosphorus pentoxide and hydrofluoric acid is disclosed and claimed. However, until the invention of the present method there was no way of producing anhydrous difluorophosphoric acid alone on a commercial scale so far as we are aware and it therefore differs from the aforesaid methods not only in this particular, i. e., in its ability to produce the difluorophosphoric acid alone, but basically in the chemistry by which it is produced.

Chemical literature discloses that the ions of difluorophosphoric acid are formed by hydrolysis of phosphorus oxytrifluoride ($POF_3$) according to the equation $POF_3+H_2O=HPO_2F_2+HF$, but the difluorophosphoric acid prepared in this manner cannot be obtained in an anhydrous, pure state as the hydrogen fluoride formed enters into secondary reactions producing impurities which cannot be easily removed. Moreover a further obstacle in the hydrolysis of phosphorus oxytrifluoride is the fact that hydrolysis of the $POF_3$ is not completed before hydrolysis of the difluorophosphoric acid begins with resultant formation of monofluorophosphoric acid and hydrogen fluoride. Our investigations have demonstrated that these reactions are not simple ones but that equilibria are formed some of which are expressed by the following equations:

$$HPO_2F_2+H_2O \rightleftarrows H_2PO_3F+HF$$

and $H_2PO_3F+H_2O \rightleftarrows H_3PO_4+HF$. It results that hydrolysis of phosphorus oxytrifluoride with water does not afford a pure anhydrous monofluorophosphoric or difluorophosphoric acid in economical yields.

Reactions similar to those just indicated also occur when phosphorus pentoxide is heated with calcium fluoride at high temperatures and the phosphorus oxytrifluoride, formed in this reaction, reacts with moisture present in the reaction chamber. However, the quantities of difluorophosphoric acid obtainable in this manner are so small that the process is of no commercial interest as a method of producing it.

We have discovered that the fluorine atoms in phosphorus oxytrifluoride and difluorophosphoric acid may under proper conditions be easily exchanged with hydroxyl groups of orthophosphoric and monofluorophosphoric acids, that is, in the series $PO(OH)_3$, $POF(OH)_2$, $POF_2(OH)$ and $POF_3$, typified by the formula $POF_n(OH)_{3-n}$ in which $n$ represents 0, 1, 2 or 3, the OH and F atoms can be interchanged as long as no molecule is built up containing more F atoms than the molecule containing the largest number of F atoms prior to the start of the reaction, and our invention is predicated on this discovery as by taking advantage of it various compounds may be transformed into others.

The general reaction involved in the practice of our invention is expressed by the following equation:

$$H_3PO_4+x.POF_3= \quad (1)$$
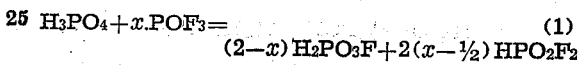

i. e., $$PO(OH)_3+x.POF_3=$$
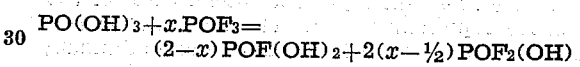

in which $x$ is ascribed any value between ½ and 2 inclusive; in accordance therewith if $x$ moles $POF_3$ are reacted with 1 mole $H_3PO_4$ approximately the following molar yields of monofluorophosphoric and difluorophosphoric acids are obtained:

| Value of $x$ in terms of Moles | Theoretical yields in Moles | |
|---|---|---|
| | Monofluorophosphoric Acid | Difluorophosphoric Acid |
| ½ | 1½ | |
| 1 | 1 | 1 |
| 1½ | ½ | 2 |
| 2 | | 3 |

The values of $x$ in this table are given by way of example only as it will be understood that $x$ may be ascribed any value between 0 and 2 with correspondingly modified results. However, if $x$ is less than ½ a corresponding quantity of monofluorophosphoric acid is formed but in mixture with the surplus of water-free orthophosphoric acid, and as this mixture cannot be separated into its two components it is consequently of but limited commercial interest. If $x$ is exactly ½, monofluorophosphoric acid only is obtained; if $x$ is increased above ½, correspondingly increased quantities of difluorophosphoric acid are formed which can be separated from the monofluorophosphoric acid by distillation under reduced pressure, and when $x$ reaches 2, difluorophosphoric acid only is obtained. If $x$ be ascribed a higher value than 2, with resultant surplus of $POF_3$, no additional reaction is produced.

In accordance with the reaction typified by this equation an almost pure anhydrous difluorophosphoric acid may be obtained by reacting phosphorus oxytrifluoride upon water-free orthophosphoric acid; equation 1 then becomes:

$$H_3PO_4 + 2POF_3 = 3HPO_2F_2 \quad (2)$$

i. e., $PO(OH)_3 + 2POF_3 = 3POF_2(OH)$ and the product is of a grade sufficiently pure for commercial purposes. However it may be further purified by distillation under reduced pressure if desired.

Likewise a mixture of monofluorophosphoric and difluorophosphoric acids may be obtained by reacting phosphorus oxytrifluoride upon water-free orthophosphoric acid in which case equation 1 becomes:

$$H_3PO_4 + POF_3 = H_2PO_3F + HPO_2F_2 \quad (3)$$

i. e., $PO(OH)_3 + POF_3 = POF(OH)_2 + POF_2(OH)$. The resultant mixture may be separated by distillation under reduced pressure, the difluorophosphoric acid being obtained in substantially pure form as the distillate while the monofluorophosphoric acid remains as the distillation residue and is of a technical grade apparently not susceptible to further purification by vacuum distillation or otherwise.

Further, anhydrous monofluorophosphoric acid alone may be obtained by reacting phosphorus oxytrifluoride upon water-free orthophosphoric acid in which case Equation 1 becomes:

$$H_3PO_4 + \tfrac{1}{2}POF_3 = 1\tfrac{1}{2}H_2PO_3F \quad (4)$$

i. e., $PO(OH)_3 + \tfrac{1}{2}POF_3 = 1\tfrac{1}{2}POF(OH)_2$. Equations 2 and 4 thus represent special cases of the general Equation 1 in which the variable $x$ is accorded respectively its maximum and minimum values of 2 and ½, while in Equation 3 it is accorded an intermediate value of 1.

The reactions do not take place instantaneously but require time to go to completion, increase in temperature enhancing the rate of reaction as will be readily understood. Prior to the stage of the final products being reached in these reactions, however, intermediate stages are passed as can be demonstrated by known analytical methods and of which brief mention may be made. Thus during the reaction between water-free orthophosphoric acid and phosphorus oxytrifluoride in the ratio of 1 mole $H_3PO_4$: 1 mole $POF_3$ (Equation 3), at some intermediate stage more difluorophosphoric acid is present than monofluorophosphoric acid and accordingly some still unreacted orthophosphoric acid is likewise present whereby the orthophosphoric acid reacts with the difluorophosphoric acid to form monofluorophosphoric acid according to the equation:

$$H_3PO_4 + HPO_2F_2 = 2H_2PO_3F \quad (5)$$

i. e., $PO(OH)_3 + POF_2(OH) = 2POF(OH)_2$. Another is the reaction of the monofluorophosphoric acid with phosphorus oxytrifluoride with formation of difluorophosphoric acid according to the equation:

$$H_2PO_3F + POF_3 = 2HPO_2F_2 \quad (6)$$

i. e., $POF(OH)_2 + POF_3 = POF_2(OH)$. We have also discovered that these reactions designated as (5) and (6) may be carried out in an isolated system, using pure components, outside the general reaction mixture to which we have referred and consequently in this way either the monofluorophosphoric or the difluorophosphoric acid may be produced.

The various reactions typified by Equations 1–6 take place quantitatively and at any temperature from comparatively low to comparatively high ones, the rate of reaction depending upon the difference in the number of fluorine atoms present in the two types of molecules reacting with each other and upon the reaction temperature. In none of them is water or hydrogen fluoride formed so that the above mentioned equilibria do not exist in the practice of our invention which constitutes one of its important features.

We are fully aware of the possibility that intermediary reactions other than those to which we have referred may take place in the reaction products obtained by introducing phosphorus oxytrifluoride into orthophosphoric acid or monofluorophosphoric acid, but knowledge thereof, if in fact they do occur, is unnecessary for the practical employment of our invention since the reactions typified by Equations 1–4 inclusive though complex in themselves finally go to completion with or without the application of heat, and the intermediary reaction Equations 5 and 6 also go to completion when carried out in an isolated system. It follows that in such employment, whatever be the specific procedure adopted, satisfactory results may be obtained as long at water-free orthophosphoric acid is reacted with phosphorus oxytrifluoride in the ratio of 1 mole $H_3PO_4$ : $x$ moles $POF_3$ in which $x$ is ascribed any value between ½ and 2 inclusive, or anhydrous monofluorophosphoric acid is reacted with phosphorus oxytrifluoride in a ratio of 1 mole $H_2PO_3F$ : 1 mole $POF_3$ or water-free orthophosphoric acid is reacted with anhydrous difluorophosphoric acid in a ratio of 1 mole $H_3PO_4$ : 1 mole $HPO_2F_2$.

In the practice of the invention if heat is applied with a view to increasing the rapidity of the reaction the latter should be performed in a closed vessel to suppress the tendency of difluorophosphoric acid to start decomposition at temperatures higher than about 100° C. and of monofluorophosphoric acid to start decomposition at temperatures higher than about 160° C.; it is desirable also that the container be filled to such an extent as to leave but little free space.

The phosphorus oxytrifluoride, $POF_3$, may be prepared in any suitable way as by reacting zinc fluoride with phosphorus oxytrichloride, or by reacting antimony trifluoride with phosphorus oxytrichloride, or by heating calcium fluoride with phosphorus pentoxide at a high temperature. The last mentioned reaction may be carried out in batch form, or in a continuous process by introducing the reaction components into a closed rotary retort in the form of a slightly inclined gear-driven cylinder which is heated in a heating chamber and through which moves a constant stream of a mixture of the reaction components, the gaseous phosphorus oxytrifluoride being constantly developed in the cylinder and led to the reaction vessel containing orthophosphoric or monofluorophosphoric acid and the solid reaction product being continuously withdrawn at the lower end of the reaction cylinder with the help of a special sealing device which prevents loss of $POF_3$ and entrance of air; the reaction may also be carried out by using flat boxes, open at the top and partly filled with the reaction components, which are passed in an endless procession through a tunnel, heated from the outside and closed at both ends with special sealing devices.

Moreover, instead of using phosphorus oxytrifluoride prepared in the foregoing or any other convenient way, we may employ the gaseous mixture formed as the by-product of the reaction of fluoroapatite with small quantities of phosphorus pentoxide and consisting of phosphorus oxytrifluoride, silicon tetrafluoride and carbon dioxide. The use of this mixture in the practice of our method results in a fairly slow reaction because of the dilution of the reactive component, namely $POF_3$, with inert matter; it is therefore desirable to condense the mixture and fractionally distill it in order to obtain a more concentrated phosphorus oxytrifluoride. This product is eminently suitable for the purpose.

The phosphorus oxytrifluoride may be reacted with the orthophosphoric or monofluorophosphoric acid by introducing the gas in a fine dispersion near the bottom of a reaction vessel containing the acid, the vessel being desirably elongated vertically so that the gas passes through the acid for a relatively great distance, thus affording opportunity for a large part of the phosphorus oxytrifluoride to be absorbed by the acid. Especially near the end of the reaction, however, some of the gas escapes from the acid unabsorbed and this escaping gas is preferably removed from near the top of the closed reaction vessel and pumped back or otherwise returned to its gas inlet. Another way of effecting the desired reaction is to stir the acid in an atmosphere of $POF_3$ in a closed vessel equipped with a fast running stirrer, thus offering large constantly formed fresh surfaces to the gas which is replaced from a storage container as it is absorbed, while still another is to spray the acid in a fine dust into a reaction chamber filled with phosphorus oxytrifluoride which is constantly replenished from a suitable source, or in lieu of any of these ways of bringing about the reaction any other manner of suitably producing it may be employed. Where the reaction is to be effected between orthophosphoric acid and difluorophosphoric acid alone in accordance with Equation 5, it may be best carried out by merely mixing the components in an appropriate container.

The following are illustrative of various ways of practising the method of our invention:

*Example 1.*—4.9 parts by weight of liquid water-free orthophosphoric acid were placed in a vertically elongated glass reaction chamber having near its bottom a perforated disk forming the end of a gas inlet tube to thereby effect a fine distribution of the gas bubbles emanating from the disk, the chamber being closed and provided near its upper end with an outlet for nonabsorbed gas. The chamber was arranged for disconnection from the means for supplying the $POF_3$ so that by weighing it the quantity of the latter absorbed by the orthophosphoric acid could be determined. The entire equipment was made of Pyrex glass. Phosphorus oxytrifluoride was passed through the acid until 9.6 parts by weight were absorbed and the reaction product then consisted of difluorophosphoric acid which, as hitherto indicated, was capable of purification by distillation under reduced pressure, the acid boiling at about 70° C. at a pressure of 200 mm. of mercury. The reaction in this example was therefore in accordance with Equation 2.

*Example 2.*—4.9 parts by weight of liquid water-free orthophosphoric acid were placed in the reaction chamber and reacted with phosphorus oxytrifluoride as described in Example 1. After 5.7 parts by weight of the acid had been absorbed, introduction of $POF_3$ was discontinued and the reaction product kept in the closed container at 80° C. for 4 hours. The reaction product then, as ascertained by suitable analytical methods, consisted of about equal parts by weight of monofluorophosphoric and difluorophosphoric acids, the latter being capable of separation in vapor form from the product by distillation under reduced pressure, the monofluorophosphoric acid remaining as the distillation residue. This example was therefore in accordance with Equation 3.

*Example 3.*—4.9 parts by weight of liquid water-free orthophosphoric acid were reacted with 2.8 parts by weight of phosphorus oxytrifluoride in the manner in Example 1 and using the same equipment, the reaction product being kept for 9 hours at 80° C. in the closed reaction vessel. Analysis showed the product to be free of unreacted orthophosphoric acid and of noticeable quantities of difluorophosphoric acid and to consist substantially of anhydrous monofluorophosphoric acid only. This example was therefore in accordance with Equation 4.

*Example 4.*—5.0 parts by weight of anhydrous monofluorophosphoric acid were reacted with phosphorus oxytrifluoride as described in Example 1, the introduction of the oxytrifluoride being discontinued after 4.6 parts by weight were absorbed by the acid. The reaction product consisted of difluorophosphoric acid capable of further purification by distillation under reduced pressure as in the case of Example 1. This example was therefore in accordance with Equation 6.

*Example 5.*—2.45 parts by weight of liquid water-free orthophosphoric acid were mixed in a silver crucible with 2.55 parts by weight of anhydrous difluorophosphoric acid and covered with a silver lid; after the formation of heat had ceased the crucible and contents had been maintained for 8 hours at 80° C., the difluorophosphoric acid had disappeared and the reaction products consisted of monofluorophosphoric acid only. This example was therefore in accordance with Equation 5.

All the foregoing examples numberd 1–5 inclusive are given by way of illustration only and not in any restrictive or limiting sense since many other ways may be employed for combining and subsequently treating the initially supplied components in order to conform to special requirements of the equipment being utilized and other determining factors.

The reaction vessels may be those customarily utilized for similar or analogous operations and may be made of stainless steel, silver or other corrosion resistant material or may be plated therewith and, according to conditions of the reaction, ordinary or pressure vessels may be used.

It will now be apparent that by the practice of the invention either anhydrous monofluorophosphoric acid or anhydrous difluorophosphoric acid or both may be readily produced by exchange of fluorine atoms with hydroxyl groups through reaction between anhydrous compounds of the general type $POF_n(OH)_{3-n}$ in which $n$ represents 0, 1, 2, or 3 by mixing two compounds of this general type showing a difference in the number of the fluorine atoms in their molecules of 2 or 3. Thus our invention for the first time, as far as we are aware, makes possible the production of anhydrous difluorophosphoric acid alone while it also may be practised to produce that acid in conjunction with anhydrous monofluorophosphoric acid or the latter acid alone, all of said acids being in a form suitable for industrial uses and the method itself being capable of convenient, economical operation in a commercial way.

Having thus described our invention, we claim and desire to protect by Letters Patent of the United States:

1. The method of producing anhydrous fluorophosphoric acids which comprises mixing any two of the compounds selected from the group consisting of $H_3PO_4$, $H_2PO_3F$, $HPO_2F_2$ and $POF_3$ which have a difference of at least two in the number of fluorine atoms in their respective molecules.

2. The method of producing anhydrous fluorophosphoric acids which comprises mixing phosphorus oxytrifluoride with water-free orthophosphoric acid according to the equation $$H_3PO_4 + x POF_3 = (2-x) H_2PO_3F$$
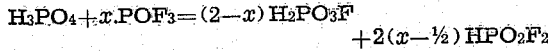
$$+ 2(x - \tfrac{1}{2}) HPO_2F_2$$

in which $x$ is ascribed any value between ½ and 2 inclusive.

3. The method of producing anhydrous difluorophosphoric acid which comprises mixing anhydrous monofluorophosphoric acid with phosphorus oxytrifluoride.

4. The method of producing a mixture of anhydrous monofluorophosphoric and difluorophosphoric acids which comprises mixing phosphorus oxytrifluoride with water-free orthophosphoric acid.

5. The method of producing anhydrous monofluorophosphoric acid which comprises mixing phosphorus oxytrifluoride with water-free orthophosphoric acid in the ratio of 1 mole $H_3PO_4$ : ½ mole $POF_3$ according to the equation $$H_3PO_4 + \tfrac{1}{2} POF_3 = 1\tfrac{1}{2}\, H_2PO_3F$$

6. The method of producing anhydrous monofluorophosphoric and difluorophosphoric acids which comprises mixing phosphorus oxytrifluoride with water-free orthophosphoric acid in the ratio of 1 mole $H_3PO_4$ : 1 mole $POF_3$ according to the equation $H_3PO_4 + POF_3 = H_2PO_3F + HPO_2F_2$.

7. The method of producing anhydrous difluorophosphoric acid which comprises mixing phosphorus oxytrifluoride with water-free orthophosphoric acid in the ratio of 1 mole $H_3PO_4$ : 2 moles $POF_3$ according to the equation $$H_3PO_4 + 2 POF_3 = 3 HPO_2F_2$$

8. The method of producing anhydrous difluorophosphoric acid which comprises mixing phosphorus oxytrifluoride with anhydrous monofluorophosphoric acid in the ratio of 1 mole $H_2PO_3F$ : 1 mole $POF_3$ according to the equation $$H_2PO_3F + POF_3 = 2 HPO_2F_2$$

9. The method of producing anhydrous monofluorophosphoric acid which comprises mixing water-free orthophosphoric acid and anhydrous difluorophosphoric acid in the ratio of 1 mole $H_3PO_4$ : 1 mole $HPO_2F_2$ according to the equation $$H_3PO_4 + HPO_2F_2 = 2 H_2PO_3F$$

10. The method of producing a mixture of anhydrous monofluorophosphoric and difluorophosphoric acids which comprises mixing water-free orthophosphoric acid with phosphorus oxytrifluoride in the ratio of 1 mole $H_3PO_4$ to more than ½ mole and less than 2 moles $POF_3$.

WILLY LANGE.
RALPH LIVINGSTON.